United States Patent [19]

Jung et al.

[11] Patent Number: 5,432,255
[45] Date of Patent: Jul. 11, 1995

[54] PREPARATION OF FIBER-FORMING META-ARAMIDS

[75] Inventors: Holger Jung, Niedernhausen; Peter Klein, Wiesbaden; Uwe Kampschulte, Hattersheim am Main, all of Germany

[73] Assignee: Hoechst AG, Frankfurt, Germany

[21] Appl. No.: 55,234

[22] Filed: Apr. 28, 1993

[30] Foreign Application Priority Data

Apr. 30, 1992 [DE] Germany .......................... 42 14 460.4

[51] Int. Cl.$^6$ .................... C08G 69/28; C08G 69/26
[52] U.S. Cl. .................... 528/336; 528/344; 528/348; 524/606; 524/607; 524/726
[58] Field of Search .................... 528/336, 344, 348; 524/606, 607, 726

[56] References Cited

U.S. PATENT DOCUMENTS

| | | |
|---|---|---|
| 3,006,899 | 10/1961 | Hill et al. . |
| 3,354,127 | 11/1967 | Hill et al. . |
| 3,414,645 | 12/1968 | Morgan . |
| 3,991,037 | 11/1976 | Eckardt . |
| 4,389,521 | 6/1983 | Shimada et al. .................... 528/336 |
| 5,124,436 | 6/1992 | Keil et al. . |

FOREIGN PATENT DOCUMENTS 49-130495 12/1974 Japan .

*Primary Examiner*—Paul R. Michl
*Assistant Examiner*—P. Hampton-Hightower
*Attorney, Agent, or Firm*—Connolly & Hutz

[57] ABSTRACT

A process is described for preparing directly spinnable polymer solutions containing as fiber-forming substance polymers containing at least 95 mol %, based on the polymer, of the recurring structural unit of the formula I $$[-CO-R^1-CO-NH-R^2-NH-] \qquad (I)$$

and up to 5 mol % of structural units as formed in the conversion/reaction of aromatic, aliphatic or cycloaliphatic dicarbonyl dichlorides and/or diamines. $R^1$ and $R^2$ are independently of each other 1,6-naphthylene, 1,7-naphthylene, 2,7-naphthylene, 3,4'-biphenyldiyl or 1,3-phenylene. The polymers prepared by reacting diamines of the formula (II) with dicarbonyl dichlorides of the formula (III) in solution $$H_2N-R^2-NH_2 \qquad (II)$$

$$ClOC-R^1-COCl \qquad (III)$$

The process contains the steps of
 a) presenting the diamines as initial charge in the form of a solution in N-methylpyrrolidone,
 b) adding the dicarbonyl dichlorides to this solution,
 c) using starting monomers having a purity of greater than 99.9% and a water content of less than 70 ppm, measured by the method of Karl Fischer,
 d) polycondensing at temperatures between $-20°$ and $100°$ C. with forced circulation of the reaction solution,
 e) terminating the polycondensation at a certain inherent viscosity of the polymer of at least 1.5 dl/g, measured on a 0.5% strength polymer solution in concentrated $H_2SO_4$ at 25° C., by neutralizating of the reaction solution by addition of basic alkali metal and/or alkaline earth metal salts.

11 Claims, No Drawings

PREPARATION OF FIBER-FORMING META-ARAMIDS

DESCRIPTION

Preparation of Fiber-Forming Meta-Aramids

The present invention relates to a novel process for preparing certain fiber-forming aromatic polyamides (hereinafter termed aramids). More particularly, the invention concerns a process for preparing meta-aramids and novel meta-aramids of high molecular weight and a narrow molecular weight distribution obtainable by said process.

meta-Aramids, such as poly (m-phenyleneisophthalamide), are polymers in commercial use which can be processed in particular into fibers having good mechanical properties, such as strength and extensibility, flame resistance and chemical resistance.

These polymers are usually synthesized in organic nonbasic solvents, in particular in halogenated organic solvents. Examples of such methods of synthesis can be found in U.S. Pat. Nos. 3,094,511 and DE-B-1,107,399. Other methods of synthesis use dimethylacetamide as the solvent (U.S. Pat. No. 3,063,966). From the as-synthesized solution the polymers are in general precipitated and, after washing, redissolved in the spinning solvent, usually an aprotic organic amide solvent (U.S. Pat. Nos. DE-C-1,243,820, DE-C-2,325,139).

The direct preparation of the spinning solution by polycondensation in the contemplated spinning solvent is achieved only in the case of synthesis in dimethylacetamide (DMAc) and subsequent dry spinning. DMAc is sufficiently basic to bind the hydrogen chloride which is formed. Neutralization produces for every mole of polymer also 1 mol of an alkali and/or alkaline earth metal salt, depending on the neutralizing agent used. The salt will normally amount to about 50% by weight of the amount of aramid. Since this stated amount of salt would interfere with wet spinning, a filament can be formed only by dry spinning (U.S. Pat. No. 3,360,598).

Furthermore, U.S. Pat. No. DE-A-3,835,401 discloses a process for preparing aromatic copolyamides wherein aromatic dicarbonyl dichlorides and diamines which have valence bonds in the para position are polycondensed at elevated temperature in a known polyamide solvent, including inter alia in N-methylpyrrolidone.

It is true that the polycondensation of 1,3-phenylenediamine and isophthaloyl dichloride in N-methylpyrrolidone is known per se from JP-A-49-130,495, but the m-aramids described therein do not have a sufficiently high molecular weight for forming filaments having good textile properties. The average molecular weight attainable by this prior art process is reported as not more than 50,000. The referenced document is concerned with studying the effect of the moisture content of the solvent on the degree of polymerization.

It has now been found that the polycondensation of meta-aramids to high molecular weights can be carried out directly in NMP as spinning solvent. The method leads to meta-aramids having a very low ratio of weight average molecular weight to number average molecular weight, $M_w/M_n$, which corresponds to a narrow molecular weight distribution and is favorable for the processing of fibers. This makes possible appreciable improvements in the economy of the fibermaking process, since for example there is no need to precipitate the polymer from the polycondensation solvent and redissolve it, or since there is no need for apparatus for recovering the polycondensation solvent.

Moreover, the contemplated process can be carried out without environmentally harmful halogenated organic solvents.

The present invention accordingly provides a process for preparing directly spinnable polymer solutions of fiber-forming polymers dissolved in N-methylpyrrolidone which comprise at least 95 mol %, based on the polymer, of recurring structural units of the formula (I)

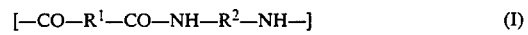

where $R^1$ and $R^2$ are independently of each other divalent aromatic radicals, and not more than 5 mol % of structural units as formed in the reaction/conversion of aromatic, aliphatic or cycloaliphatic dicarbonyl dichlorides and/or diamines by reacting diamines of the formula (II) with dicarbonyl dichlorides of the formula (III)

where $R^1$ and $R^2$ are independently of each other divalent aromatic radicals, and optionally up to 5 mol %, based on the total amount of monomer, of aromatic, aliphatic or cycloaliphatic dicarbonyl dichlorides and/or diamines, by the following steps:

a) presenting the diamines as initial charge in the form of a solution in N-methylpyrrolidone (NMP), b) adding the dicarbonyl dichlorides to this solution, c) polycondensing at temperatures between $-20°$ and $100°$ C. with forced circulation of the reaction solution, d) terminating the polycondensation at a certain inherent viscosity of the polymer by adding a monofunctional chain stopper and neutralizing the reaction solution by addition of basic alkali metal and/or alkaline earth metal salts or by neutralizing the reaction solution without addition of a chain stopper, which comprises using as the diamines of the formula (II) those in which the radical $R^2$ is derived from naphthalene-1,6-, naphthalene-1,7-, naphthalene-2,7-, biphenyl-3,4'- or 1,3-phenylenediamine, using as the dicarbonyl dichlorides of the formula (III) those in which the radical $R^1$ is derived from naphthalene-1,6-, naphthalene-1,7-, naphthalene-2,7- or biphenyl-3,4'-dicarboxylic acid or from isophthalic acid, using the starting monomers at a purity of greater than 99.9% and a water content of less than 70 ppm, measured by the method of Karl Fischer, and terminating the polycondensation at an inherent viscosity of the polymer of at least 1.5 dl/g, measured on a 0.5% strength polymer solution in concentrated $H_2SO_4$ at $25°$ C.

In addition to the recurring structural units of the formula I, the m-aramids of this invention may contain up to 5 mol %, based on the polymer, of other divalent aromatic, aliphatic or cycloaliphatic radicals derived from aromatic, aliphatic or cycloaliphatic dicarbonyl dichlorides and/or diamines.

At least 95 mol % of the m-aramids of this invention comprises recurring structural units of the formula I in which, within the framework of the laid-down definition, the radicals $R^1$ and/or $R^2$ may also differ within a molecule.

$R^1$ and/or $R^2$ are each preferably 1,3-phenylene.

The process of the invention comprises the reaction of aromatic dicarbonyl dichlorides of the formula (III) with aromatic diamines of the formula (II), in each case as defined above. The compounds of the formula (II) and/or of the formula (III) can also be used in the form of mixtures. If desired, up to 5 mol %, based on the total amount of monomer, of aromatic, aliphtic or cycloaliphatic dicarbonyl dichlorides and/or diamines is used. As aromatic monomers of this type there may be mentioned para-monomers.

The ratio of diamine to dicarbonyl dichloride shall in every case be such as to produce aramids having the desired high molecular weight. The molar proportion of all dicarbonyl dichloride is advantageously such that it virtually corresponds to the molar proportion of all diamine. The molar amounts of the two types of monomers should not differ by more than about 1%, preferably by not more than 0.2%.

Suitable aromatic dicarboxylic acids from which the monomers of the formula (III) are derived are 1,6-naphthalenedicarboxylic acid, 1,7-naphthalenedicarboxylic acid, 2,7-naphthalenedicarboxylic acid, 3,4'-biphenyldicarboxylic acid and in particular isophthalic acid.

Suitable aromatic diamines of the formula (II) are 1,6-naphthalenediamine, 1,7-naphthalenediamine, 2,7-naphthalenediamine, 3,4'-biphenyldiamine and in particular 1,3-phenylenediamine.

The monomers to be used must be present in a purity of more than 99.9% and have a water content of less than 70 ppm, preferably less than 50 ppm. These measures are necessary in order that the desired high molecular weights may be obtained. The water content is measured by the conventional Karl Fischer method.

The polycondensation is carried out as a solution polycondensation in NMP. To this end the diamines are dissolved in NMP and the dicarbonyl dichlorides are added. For this the dicarbonyl dichlorides can be used in the form of solids, finely divided, preferably in the form of a melt or particularly preferably in the form of a solution in NMP.

The rate of addition of the dicarbonyl dichlorides to the reaction solution is such that the strongly exothermic reaction remains under control. The metered addition is preferably carried out in such a way that the temperature of the reaction mixture does not exceed 70° C. This can be effected by control of the rate of addition and in particular by particularly vigorous stirring of the reaction solution.

The polycondensation is carried out with forced circulation of the reaction solution at temperatures between −20° and 100° C. Preferred reaction temperatures are within the range from 40° to 60° C.

On attainment of the desired molecular weight, as expressed by an inherent viscosity of at least 1.5 dl/g (as defined above), the polycondensation is terminated. This is done by neutralizing the acidic reaction solution with basic alkali metal and/or alkaline earth metal compounds. Prior to this step the reaction can advantageously be terminated by adding monofunctional chain stoppers, such as monocarbonyl chlorides, in particular acetyl chloride or benzoyl chloride.

Examples of basic alkali metal and alkaline earth metal compounds are lithium hydroxide and in particular calcium oxide and/or calcium hydroxide.

The process of the invention is preferably carried out in such a way that, after the polycondensation has ended, the concentration of the polymer is 15 to 25% by weight, based on the reaction solution. In this embodiment the spinning solution is obtained in a high polymer concentration, which is advantageous for the productivity of the subsequent spinning process.

A further advantageous embodiment of the process of the invention concerns the amount of basic alkali metal and/or alkaline earth metal salts. On neutralization they are formed in an amount equimolar with the aramid. The resulting salt concentration of the reaction solution is 5 to 13% by weight, based on the reaction solution.

The process of the invention is particularly preferably conducted in such a way that the polycondensation is terminated at an inherent viscosity of the polymer within the range from 1.5 to 2.5 dl/g, measured on a 0.5% strength polymer solution in $H_2SO_4$ at 25° C.

Particularly high viscosities are obtainable when the forced circulation of the reaction solution is effected by stirring with a double helical stirrer or a planetary mixer-kneader reactor.

The invention further provides aromatic polyamides comprising at least 95 mol %, based on the polymer, of the recurring structural unit of the formula I, as defined above, with an inherent viscosity of at least 1.5 dl/g, measured on a 0.5% strength polymer solution in $H_2SO_4$ at 25° C. obtainable by the above-defined process, wherein the meta-aramids have a narrow molecular weight distribution $M_w$ to the number average molecular weight $M_n$, the averages having been determined by gel permeation chromatography on 0.05% strength polymer solutions in NMP at 65° C.

meta-Aramids having these properties differ from prior art meta-aramids in having:

1) a very narrow molecular weight distribution $M_w/M_n$, and
2) high inherent viscosities.

The extruding of the extrudable solution to form a shaped article can be effected by the dry jet wet spinning process.

The extrudable solution is extruded through a dry wet spinning jet into a coagulating liquid. It is usually advantageous for the coagulation liquid to be water or an aqueous solution which contains a polar organic solvent. This polar organic solvent can be selected from among the same amide solvents which are usually used for dissolving the aramid.

The polar organic solvent used in the coagulation liquid is preferably the same solvent which is present in the extrudable solution. The coagulation liquid is preferably used at a temperature between 0° C. and the boiling point of the coagulation liquid under atmospheric pressure.

The polar organic solvent is preferably present in the coagulation liquid in a concentration of between 70% by weight and less, in particular between 50% by weight and less.

The above-described spinning process is particularly suitable for forming fibers from solution.

The spun fibers are usually subjected to a drawing operation which enhances not only the mechanical properties, for example the tensile strength and the modulus of elasticity, but also the thermal properties, for example the thermal stability, of the filaments thus produced.

Filaments from the aramids of the invention are in general drawn for the purpose of achieving a mechanical strength. The draw ratio employed is customarily about 2: 1 to 5: 1. The drawing temperature is in general between 200° and 400° C., preferably between 250° and 350° C.

Drawing can be carried out in a single step, in two steps or in several steps, for which a hot plate or a cylindrical heater can be used. Moreover, the drawn filaments can be subjected to a further heat treatment at the same or at a higher temperature in order to enhance their crystalline structure.

The fibers from an aramid of the invention, which have good mechanical and thermal properties, can be used industrially in a wide variety of ways, for example as heat-resistant insulator materials, for manufacturing filter fabrics and as lightweight insulating materials.

Further properties and advantages of the invention will become apparent from the examples below.

It will be readily understood, however, that the invention is not restricted to the embodiment examples. On the contrary, on the basis of the embodiment examples the person skilled in the art has numerous options for modifications and/or additions at his or her disposal without having to depart from the basic concept of the invention.

Example 1

324.5 g (3 mol) of m-phenylenediamine are dissolved in 2396 ml of NMP and admixed at between $-10°$ and 70° C. with 609 g (3 mol) of isophthaloyl dichloride. The acid chloride is added in solid form. After about 98 mol % have been added, the viscosity is observed to increase. Once a defined stirrer resistance of 35 Nm has been reached at 50 rpm and 50° C., the reaction is terminated by adding acetyl chloride. This is followed by neutralization with 40 g of CaO (50% strength suspension in NMP). The product comprises 714 g of polymer, 333 g of $CaCl_2$ and 54 g of water. A homogeneous solution in NMP is present (20% by weight). The inherent viscosity in concentrated $H_2SO_4$ at 25° C. is 1.7 dl/g. The solution is additionally stirred for 2 hours and then filtered through 10μ.

The filtered spinning solution is spun into fibers by the dry jet wet spinning process. The fibers have a breaking strength of 33 cN/tex and a breaking extension of 16%. Their modulus is 10 N/tex.

What is claimed is:
1. A process for preparing directly spinnable polymer solutions of fiber-forming polymers dissolved in N-methylpyrrolidone which comprise at least 95 mol %, based on the polymer, of recurring structural units of the formula (I)

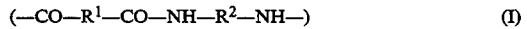

(—CO—$R^1$—CO—NH—$R^2$—NH—)  (I)

where $R^1$ and $R^2$ are independently of each other divalent aromatic radicals, with or without up to 5 mol % of other structural units as formed in the reaction/conversion of other aromatic, aliphatic or cycloaliphatic dicarbonyl dichlorides or diamines or dicarbonyl dichlorides and diamines by reacting diamines of the formula (II) with di-carbonyl dichlorides of the formula (III)

$H_2H$—$R^2$—$NH_2$  (II)

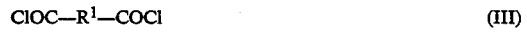

ClOC—$R^1$—COCl  (III)

where $R^1$ and $R^2$ are independently of each other divalent aromatic radicals, and with or without up to 5 mol %, based on the total amount of monomer, of other aromatic, aliphatic or cycloaliphatic dicarbonyl dichlorides or diamines or dicarbonyl dichlorides and diamines, said process comprising the following steps:
a) dissolving the (II) diamines in N-methylpyrrolidone to form a solution there,
b) adding the (III) dicarbonyl dichlorides to said solution to form a reaction solution,
c) polycondensing said reaction solution at temperatures between $-20°$ and 100° C. with forced circulation of the reaction solution,
d) terminating the polycondensation at an inherent viscosity of the polymer of at least 1.5 dl/g, measured on a 0.5% strength polymer solution in $H_2SO_4$ at 25° C., by adding a monofunctional chain stopper after neutralization of the reaction solution by addition of a basic alkali metal or alkaline earth metal salt or a combination of said salts or by neutralizing the reaction solution without addition of a chain stopper, wherein $R^2$ is naphthalene-1,6-, naphthalene-1,7-, naphthalene-2,7-, biphenyl-3,4'- or 1,3-phenylene and $R^1$ is naphthalene-1,6-, naphthalene-1,7-, naphthalene-2,7-, biphenyl-3,4'- or 1,3-phenylene, wherein starting monomers have a purity of greater than 99.9% and a water content of less than 70 ppm, and wherein said inherent viscosity of the polymer is at least 1.5 dl/g, measured on a 0.5% strength polymer solution in concentrated $H_2SO_4$ at 25° C.

2. The process as claimed in claim 1, wherein the inherent viscosity of the polymer is between 1.5 to 2.5 dl/g, measured on a 0.5% strength polymer solution in $H_2SO_4$ at 25° C.

3. The process of claim 1, wherein the dicarbonyl dichlorides are added to the reaction solution in solid form.

4. The process of claim 1, wherein the addition of the dicarbonyl dichlorides to the reaction solution is effected at such a rate that the temperature within this solution does not exceed 70° C.

5. The process of claim 1, wherein the concentrations of the monomers of the formulae (II) and (III) in the reaction solution are such that, after the polycondensation has ended, the concentration of the polymer is 15 to 25% by weight, based on the reaction solution.

6. The process of claim 1, wherein said basic alkali metal or alkaline earth metal salt or combination of said salts is added to the reaction solution in such an amount that the concentration of said salt or combination of salts in this solution is 5 to 13% by weight, based on the reaction solution.

7. The process of claim 1, wherein the diamines and dicarbonyl dichlorides are those in which $R^1$ and $R^2$ are each 1,3-phenylene.

8. The process of claim 1, wherein the basic alkaline earth metal salt is calcium oxide or calcium hydroxide.

9. The process of claim 1, wherein the monofunctional chain stopper is acetyl chloride.

10. The process of claim 1, wherein the polycondensation is terminated at an inherent viscosity of the polymer within the range from 1.5 to 2.2 dl/g, measured on a 0.5% strength polymer solution in $H_2SO_4$ at 25° C.

11. The process of claim 1, wherein the forced circulation of the reaction solution is effected by stirring with a double helical stirrer or a planetary mixer-kneader reactor.

* * * * *